(12) United States Patent
Claxton

(10) Patent No.: US 10,048,154 B2
(45) Date of Patent: Aug. 14, 2018

(54) BOOM CALIBRATION SYSTEM

(71) Applicant: Flanders Electric Motor Service, Inc., Evansville, IN (US)

(72) Inventor: Richard L. Claxton, Evansville, IN (US)

(73) Assignee: Flanders Electric Motor Service, Inc., Evansville, IN (US)

( * ) Notice: Subject to any disclaimer, the term of this patent is extended or adjusted under 35 U.S.C. 154(b) by 614 days.

(21) Appl. No.: 14/687,524

(22) Filed: Apr. 15, 2015

(65) Prior Publication Data

US 2015/0300906 A1 Oct. 22, 2015

Related U.S. Application Data

(60) Provisional application No. 61/980,782, filed on Apr. 17, 2014.

(51) Int. Cl.
*G01L 25/00* (2006.01)

(52) U.S. Cl.
CPC .................... *G01L 25/00* (2013.01)

(58) Field of Classification Search
CPC ....................................... G01L 25/00
See application file for complete search history.

(56) References Cited

U.S. PATENT DOCUMENTS

| | | |
|---|---|---|
| 4,776,751 A | 10/1988 | Saele |
| 5,461,803 A | 10/1995 | Rocke |
| 5,822,891 A | 10/1998 | Fujishima et al. |
| 6,025,686 A | 2/2000 | Wickert et al. |
| 6,496,766 B1 | 12/2002 | Bernold et al. |
| 7,912,612 B2 | 3/2011 | Janardhan et al. |
| 8,032,313 B2 | 10/2011 | Claxton |
| 8,209,096 B2 | 6/2012 | Claxton |
| 8,355,847 B2 | 1/2013 | Colwell et al. |
| 8,359,143 B2 | 1/2013 | Colwell et al. |
| 8,370,031 B2 | 2/2013 | Claxton |
| 8,515,627 B2 | 8/2013 | Marathe et al. |
| 8,560,183 B2 | 10/2013 | Colwell et al. |
| 8,571,766 B2 | 10/2013 | Colwell et al. |
| 8,620,536 B2 | 12/2013 | Colwell et al. |
| 8,660,758 B2 | 2/2014 | Janardhan et al. |

(Continued)

OTHER PUBLICATIONS

International Search Report and Written Opinion (dated Jul. 8, 2015) regarding International Application No. PCT/US2015/026082.

(Continued)

*Primary Examiner* — Manuel L Barbee
*Assistant Examiner* — Raymond Nimox
(74) *Attorney, Agent, or Firm* — Chetlin IP, P.C.

(57) ABSTRACT

A method of calibrating strain sensors operatively associated with a machine may involve the steps of: Calculating, for each of n loading conditions, at least one structural load associated with at least one member of the machine to produce n calculated structural loads corresponding to the n loading conditions; measuring, for each of n machine positions, at least one strain associated with the at least one member of the machine to produce n measured strains corresponding to the n loading conditions; and determining curve fit parameters from said n calculated structural loads and said n measured strains, the curve fit parameters relating measured strain and structural loads over n loading conditions.

20 Claims, 13 Drawing Sheets

(56) References Cited

U.S. PATENT DOCUMENTS

| | | | |
|---|---|---|---|
| 9,315,970 B2* | 4/2016 | Chitty | E02F 9/267 |
| 2007/0266601 A1* | 11/2007 | Claxton | E02F 3/30 |
| | | | 37/396 |
| 2008/0319710 A1 | 12/2008 | Hsu | |
| 2010/0100338 A1 | 4/2010 | Vik et al. | |
| 2012/0101693 A1 | 4/2012 | Taylor | |
| 2012/0263566 A1 | 10/2012 | Taylor et al. | |
| 2012/0275893 A1 | 11/2012 | Colwell et al. | |
| 2012/0290147 A1* | 11/2012 | Claxton | E02F 3/30 |
| | | | 701/1 |
| 2013/0018638 A1 | 1/2013 | Taylor | |
| 2013/0051963 A1 | 2/2013 | Taylor | |
| 2013/0110460 A1 | 5/2013 | Taylor | |
| 2014/0019014 A1 | 1/2014 | Claxton | |
| 2014/0244101 A1* | 8/2014 | Chitty | E02F 9/2054 |
| | | | 701/31.6 |

OTHER PUBLICATIONS

PCT International Search Report and Written Opinion, PCT Application No. PCT/US2013/050282, dated Dec. 20, 2013, 7 pages.

Colombian communication, English Translation, dated Jan. 3, 2018 in corresponding International Application No. PCT/US2015/026082.

Colombian communication, dated Jan. 3, 2018 in corresponding International Application No. PCT/US2015/026082.

\* cited by examiner

BOOM CALIBRATION SYSTEM

CROSS-REFERENCE TO RELATED APPLICATION

This application claims the benefit of U.S. Provisional Patent Application No. 61/980,782, filed on Apr. 17, 2014, which is hereby incorporated herein by reference for all that it discloses.

TECHNICAL FIELD

The present invention relates to excavation machines in general and more particularly to systems and methods for sensor calibration and the continuous determination structural loads in such machines.

BACKGROUND

Various types of machines, particularly excavation machines, are used in a wide variety of applications to perform a wide variety of tasks. While such machines have been used for decades with great success, recent developments in computer and sensing technologies have made it possible to monitor and control the various systems and components of such machines with increasing sophistication.

In one particular example, such computer control systems are being used with increasing frequency to control the operation of power shovels of the type commonly used for the excavation and removal of ore and/or overburden in mining operations. While such systems are commonly used to control the function and operation of various sub-systems of the machine, including motors and hydraulic actuators, the increasing sophistication of such systems has also allowed such computer control systems to optimize the working efficiency of the machines during actual operation. However, additional advantages and benefits could be realized if such systems could be configured to also accurately determine the structural loads imposed on various structural members during all aspects of machine operation.

SUMMARY OF THE INVENTION

A method of calibrating strain sensors operatively associated with a machine may involve the steps of: Calculating, for each of n loading conditions, at least one structural load associated with at least one member of the machine to produce n calculated structural loads corresponding to the n loading conditions; measuring, for each of n machine positions, at least one strain associated with the at least one member of the machine to produce n measured strains corresponding to the n loading conditions; and determining curve fit parameters from said n calculated structural loads and said n measured strains, the curve fit parameters relating measured strain and structural loads over n loading conditions.

Another method according to the teachings of the present invention may involve: Calibrating at least one tension leg strain transducer operatively associated with a tension leg in a digging machine by: Calculating, for each of n machine positions at least one tension load in an equalizer rope operatively connected to the tension leg to produce n tension loads corresponding to the n machine positions; measuring, for each of n machine positions, at least one strain in the tension leg to produce n tension leg strains corresponding to the n machine positions; and determining tension leg curve fit parameters from the n tension loads and the n tension leg strains; and calibrating at least one boom transducer operatively associated with a boom of the digging machine by: Calculating, for each of n machine positions, at least one boom load corresponding to the n machine positions; measuring, for each of n machine positions, at least one strain in the boom to produce n boom strains corresponding to the n machine positions; and determining boom curve fit parameters from the n boom loads and the n boom strains.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
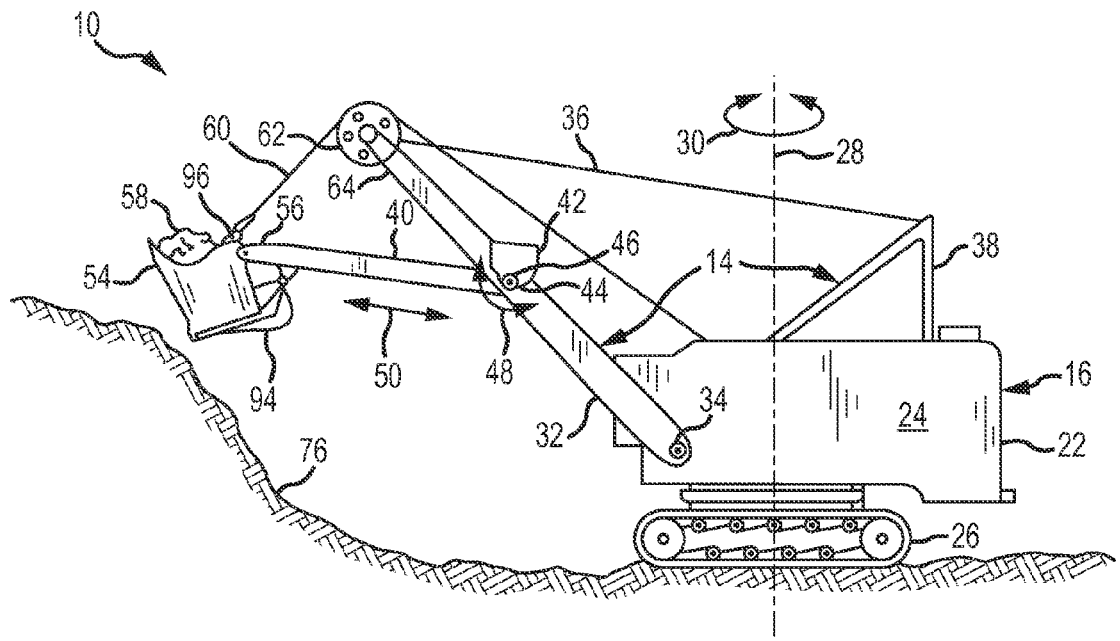
FIG. 1 is a side view in elevation of a power shovel that may embody a boom calibration system according to one embodiment of the present invention.
Figure 2:
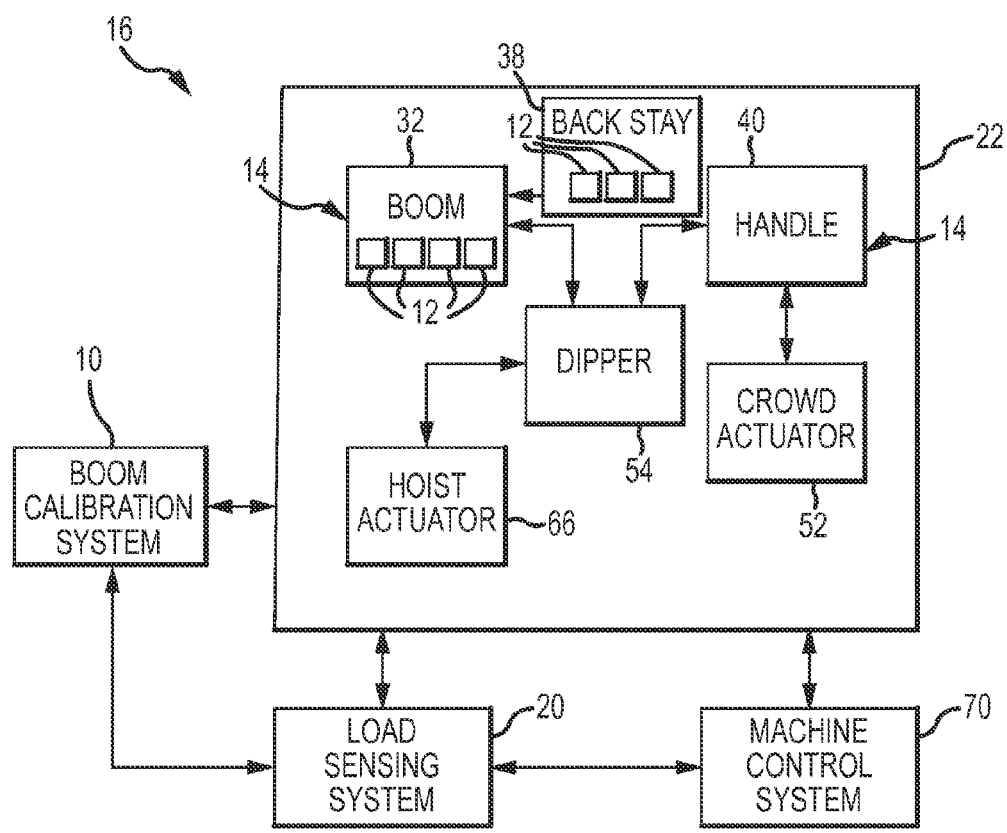
FIG. 2 is a schematic representation of the power shovel system shown in FIG. 1 showing the operational relationship of various systems, structural members, and actuators thereof.
Figure 3:
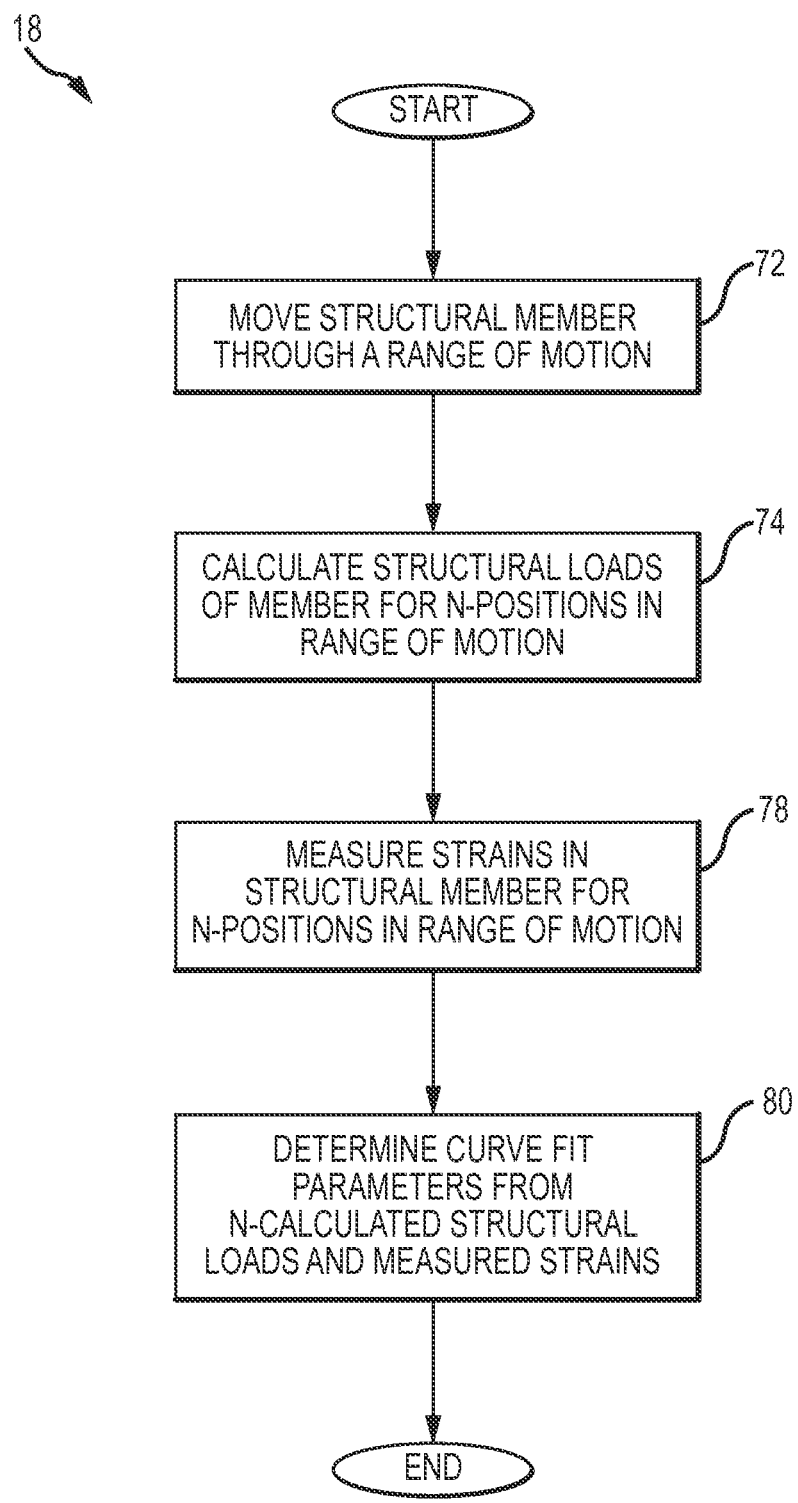
FIG. 3 is a flow chart representation of a boom calibration method according to an embodiment of the present invention.

A boom calibration system 10 according to one embodiment of the present invention is best seen in FIGS. 1-3 as it could be used to calibrate a plurality of strain sensors or transducers 12 (FIG. 2) operatively associated with one or more structural members 14 of a machine 16. Briefly, boom calibration system 10 may comprise a method 18 (FIG. 3) of determining a plurality of curve fit parameters or calibration constants based on multiple calculated structural loads and measured strains obtained from the strain sensors 12 over a range of loading conditions. In one embodiment, the range of loading conditions may be obtained by moving the various structural members 14 of machine 16 over a range of motion.

After the curve fit parameters or calibration constants have been determined, a load sensing system 20 may be used to determine or recover the actual structural loads imposed on the various structural members 14 of machine 16, e.g., during normal machine operation. In one embodiment, load sensing system 20 may determine or recover the actual structural loads on the various structural members 14 on a substantially continuous basis (i.e., in real time) and over a wide range of loading conditions, motions, and configurations. Further, because the curve fit parameters obtained by the boom calibration system 10 are determined over a range of loading conditions of the various structural members 14 of machine 16, the actual structural loads that are determined or recovered by load sensing system 20 will be highly accurate over a full range of loading conditions and motions of machine 16.

With reference now primarily to FIG. 1, in the particular embodiment shown and described herein the boom calibration system 10 may be used in conjunction with a power shovel 22 of the type commonly used in mining and quarrying operations. Power shovel 22 may comprise a house or cab 24 that is pivotally mounted to a tracked undercarriage assembly 26. The pivotal mounting arrangement allows the cab 24 to pivot or rotate with respect to undercarriage assembly 26 about pivot axis 28, generally in the directions indicated by arrows 30. A boom member 32 may be mounted to the house or cab 24 by a pinned "foot" joint 34. Boom 32 may be supported or held in a desired position by one or more suspension or equalizer ropes 36 affixed to a back stay assembly 38 of cab 24.

A stick or handle member 40 is movably mounted to the boom 32 by a saddle block assembly 42. Saddle block assembly 42 allows handle member 40 to pivot with respect to boom 32 about a pivot axis 44 defined by a joint 46, i.e., generally in the directions indicated by arrows 48. Saddle block assembly 42 also allows the handle 40 to translate with respect to boom 32 in a motion known as "crowd," as indicated by arrows 50. In the particular embodiment shown and described herein, the saddle block assembly 42 comprises a crowd actuator system 52 that moves the handle 40 in the crowd direction 50. A dipper or bucket 54 mounted to distal end 56 of handle 40 holds the payload 58. Dipper 54 may be supported by one or more hoist ropes 60 passing over a sheave 62 mounted to distal end 64 of boom 32.

The various members of the power shovel 22 may be moved with respect to one another by various actuators. For example, a hoist actuator or motor 66 provided in cab 24 and operatively associated with the hoist rope 60 may be used to raise and lower the dipper 54. Similarly, crowd actuator 52 operatively associated with saddle block assembly 42 may be used to control the crowd 50. In one embodiment, crowd actuator 52 may comprise a rack-and-pinion drive system 68 (FIG. 13), although other configurations are possible.

As briefly described above, boom calibration system 10 may also comprise load sensing system 20. Load sensing system 20 determines the loads placed on various members of power shovel 22, e.g., during regular machine operation. In one embodiment, load sensing system 20 may operate in conjunction with a machine control system 70. Based on load information provided by the load sensing system 20, machine control system 70 may be configured to operate the various actuators (e.g., 52 and 66) of power shovel 22 in order to control the loads imposed on the various members of shovel 22 during operation.

With reference now primarily to FIGS. 2 and 3, boom calibration system 10 also may comprise a method 18 of calibrating various strain sensors or transducers 12 provided on various structural members 14 of machine 16. As mentioned earlier, method 18 determines a plurality of curve fit parameters or calibration constants based on multiple calculated structural loads and measured strains obtained over a range of loading conditions. In the particular embodiment shown and described herein, the range of loading conditions may be obtained by moving the various structural members 14 of machine 16 over a range of motion. As the machine 16 is moved over a range of motion (e.g., at step 72), the boom calibration system 10 calculates, at step 74, structural loads associated with at least one structural member of the machine. This calculation process or step 74 may be performed while the machine is in a structurally determinate position. For example, in an embodiment wherein the boom calibration system 10 is used in conjunction with a power shovel 22, the calculation process may be performed by moving the shovel 22 over a series of simulated digging cycles wherein the bucket 48 is empty and not allowed to contact the ground 76. Moving the shovel 22 over such a series of simulated digging cycles may be referred to herein in the alternative as "air digs." As will be described in greater detail below, at least certain structural members 14 of power shovel 22 will be in statically determinate positions during such a simulated digging cycle, thereby allowing the boom calibration system 10 to readily calculate the loads imposed on the various members. In one embodiment, boom calibration system 10 will determine or calculate the structural loads over number of different positions during the simulated digging cycle, thereby producing a number of individual or discrete member loads.

A next step 78 in method 18 involves measuring strains in the structural member 14, i.e., by sensing output signals produced by the various strain sensors 12. This strain measuring process 78 may be done for each of the individual or discrete positions for which the member load is calculated. That is, it is generally preferred, but not required, that there be a one-to-one correspondence between the calculated load at any particular position during the simulated digging cycle and the corresponding strain.

After the various loads and strains have been calculated and measured (e.g., at steps 74 and 78), method 18 then determines a plurality of curve fit parameters or calibration constants at step 80. The curve fit parameters or calibration constants are determined from the calculated structural loads and the corresponding measured strains at each of the individual or discrete positions for which these values have been obtained (e.g., during steps 74 and 78). As will be described in much greater detail below, curve fit parameters for determining the loads in certain structural members 14 (e.g., back stay assembly 38) may be derived from a first degree polynomial fit. Alternatively, other curve fit parameters or calibration constants for loads in other structural members 14 (e.g., in boom 32) may be derived from a multilinear fit.

Figure 4:
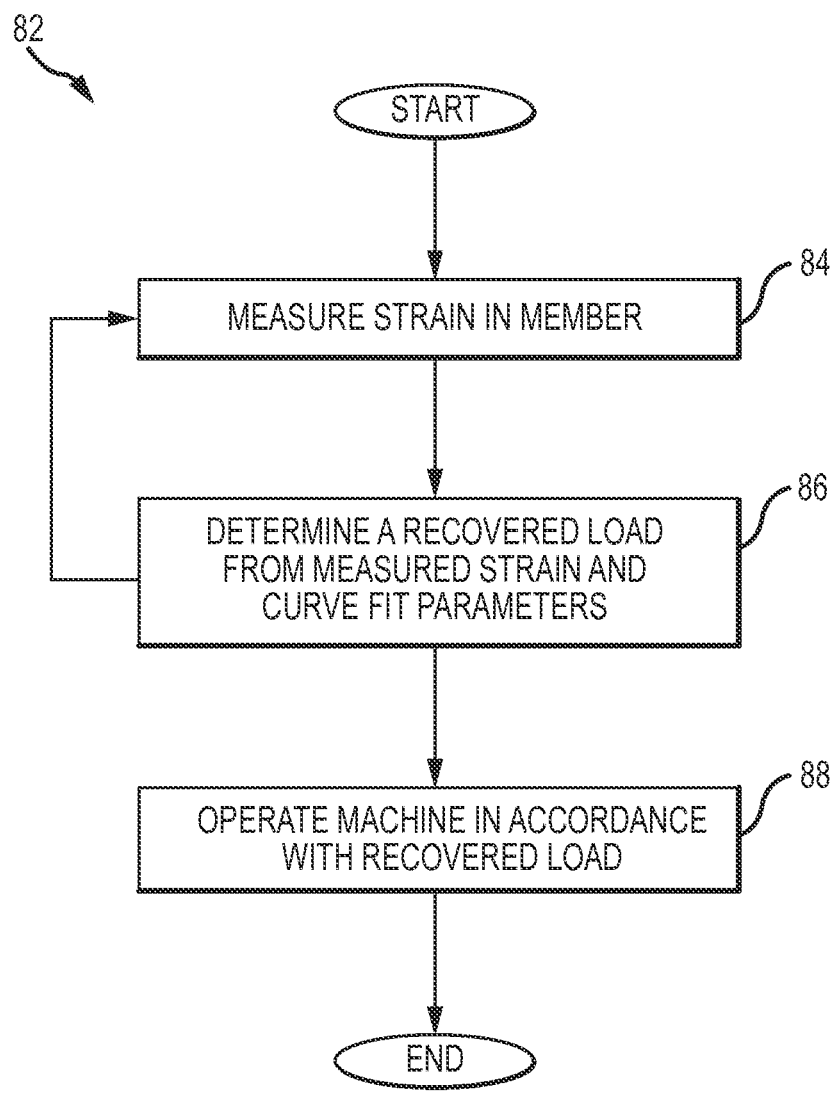
FIG. 4 is a flow chart representation of a structural load determination method according to an embodiment of the present invention.

After the curve fit parameters have been determined by method 18, load sensing system 20 may use a method 82 to determine or recover the actual structural loads imposed on the various structural members 14 of machine 16, e.g., during normal machine operation. With reference now to FIG. 4, a first step 84 of method 82 may involve measuring the strain in a structural member 14 of the machine 16. The strain may be obtained from one or more of the strain sensors or transducers 12 provided on the machine 16. Method 82 may then proceed to step 86 in which a recovered load is determined from the measured strain and the corresponding curve fit parameters determined by method 18. Steps 84 and 86 of method 82 may be repeated to allow the various recovered loads to be determined substantially continuously and in real time, i.e., during normal operation of machine 14.

In this regard it should be noted that the recovered load may be determined not only for the instrumented structural members 14 (i.e., those members 14 having strain sensors 12 operatively associated therewith), but also for other members for which loadings may be derived from the loadings on the instrumented members. For example, and as will be described in greater detail below, method 82 may be used to determine the following loads imposed on power shovel 22:

Reaction forces 33, 35 at the foot joint 34;
Reaction forces 47, 49, and torque 51 at the crowd pinion gear 90;
Reaction forces 41, 43 at the bail pin 45;
Tension 25 in the hoist rope(s) 60;
Tension 31 in the suspension rope(s) 36;
Tension and compression forces in the back stay assembly 38;
Cutting force 53 at the dipper teeth 55;
Normal and shear forces 57, 59 at the face 61 of the dipper 54; and
Dipper payload 58 while in the bank 76.

After the desired recovered loads have been determined at step 86, method 82 may proceed to step 88 in which the machine 16 may be operated in accordance with the recovered loads. For example, in one embodiment, the load sensing system 20 and machine control system 70 may be programmed or configured to operate the machine 16 so as to prevent any of the loads, or all of them, from exceeding maximum specified limits for each load. In other embodiments, the recovered loads may be used by the machine control system 70 to maximize the performance of the machine in a desired operational regime. In still other embodiments, the recovered loads may be used to provide real time fatigue monitoring of various machine components or may be used to otherwise characterize the performance of the machine or machine operator.

A significant advantage of the boom calibration system 10 according to the teachings of the present invention is that it may be used to calibrate strain sensors or transducers 12 operatively associated with various structural members 14 of the machine 16. Moreover, because the calibration process is performed over a wide range of loading conditions, the actual structural loads that are determined or recovered by load sensing system 20 will be highly accurate over a full range of loading conditions and motions of machine 16.

Still other advantages of the boom calibration system 10 is that the structural loads in the various members 14 of machine 16 may be calculated substantially continuously and on a real time basis during normal machine operation. The ability to continuously determine the actual structural loads on a real time basis provides a wide range of opportunities for improving machine performance and productivity, including opportunities for optimized dig control, real time fatigue monitoring, and shovel operator characterization, just to name a few.

Having briefly described one embodiment of the boom calibration system 10 according to the present invention, as well as some of its more significant features and advantages, various exemplary embodiments of the invention will now be described in detail. However, before proceeding with the description, it should be noted that the various embodiments of the present invention are shown and described herein as they could be implemented on a conventional power shovel 22 of the type commonly used in mining and quarrying operations. However, it should be understood that the present invention could be implemented or practiced on other types of digging machines that are now known in the art or that may be developed in the future. Of course, the present invention may also be used in conjunction with other types of machines and in other applications wherein it would be desirable to provide for the accurate calibration and substantially continuous monitoring of machine loads, as would become apparent to persons having ordinary skill in the art after having become familiar with the teachings provided herein. Consequently, the present invention should not be regarded as limited to the particular devices, systems, and applications shown and described herein.

Referring back now to FIGS. 1 and 2, the boom calibration system 10 is shown and described herein as it could be applied to or implemented on an existing power shovel 22 already in operation. That is, the power shovel 22 has been provided or retro-fitted with the boom calibration system 10 and various strain sensors or transducers 12 while in the field. Alternatively, the boom calibration system 10 could be provided on new power shovel systems during manufacture.

Regardless of whether the boom calibration system 10 is provided on a new or existing machine, power shovel 22 may comprise a house or cab 24 that is pivotally mounted to a tracked undercarriage 26. The pivotal mounting arrangement allows the cab 22 to pivot or swing with respect to undercarriage 26 about pivot axis 28, i.e., generally in the directions indicated by arrows 30. Boom member 32 is mounted to the house or cab 24 by a pinned foot joint 34 and may be supported or held in a desired elevated position by one or more suspension or equalizer ropes 36. In one embodiment, suspension ropes 36 are mounted or affixed to a back stay assembly 38 mounted to cab 22, as best seen in FIG. 1.

As briefly described above, the stick or handle member 40 may be mounted to the boom 32 by saddle block assembly 42. Saddle block assembly 42 allows handle 40 to pivot with respect to boom 32 about pivot axis 44 defined by joint 46. Saddle block assembly 42 also allows the handle 40 to translate with respect to boom 32, i.e., in the crowd direction, as indicated by arrows 50. In the particular embodiment shown and described herein, saddle block assembly 42 includes a crowd actuator system 52. In one embodiment, crowd actuator system 52 comprises a rack and pinion drive system 68 (FIG. 13) in which a drive pinion 90 engages a gear rack 92 mounted to the stick 40. Drive pinion 90 is operatively connected to a motor (not shown). Rotation of the drive pinion 90 causes the handle 40 to move back and forth in the direction indicated by arrows 50 to control the crowd.

Figure 5:
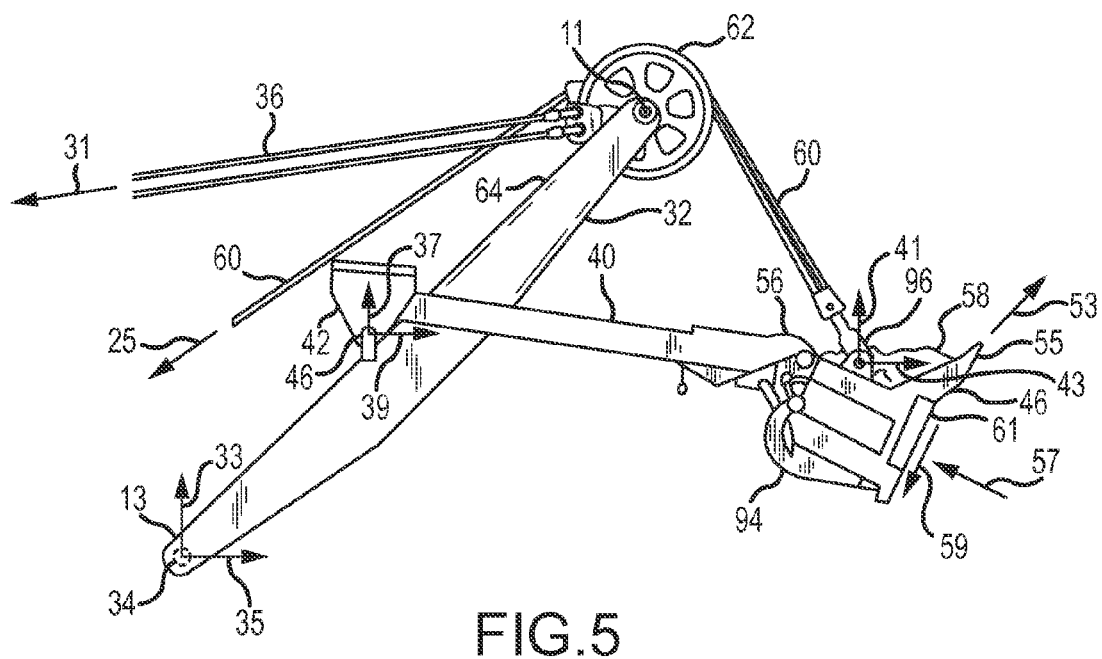
FIG. 5 is a free-body diagram of a boom-handle-dipper system of a power shovel showing various forces acting thereon.

Referring now to FIGS. 1 and 5, the dipper or bucket 54 is mounted to the distal end 56 of handle 40 and is provided with a door 94 to allow payload 58 to be released from dipper 54. The dipper or bucket 54 may be connected to one or more hoist ropes 60 by means of a bail assembly 96. The hoist ropes 60 pass over sheave 62 mounted to the distal end 64 of boom 32 and are operatively connected to the hoist actuator 66 (FIG. 2) provided within cab 24. The hoist actuator 66 may then raise and lower dipper 54 via hoist ropes 60.

Of course, power shovel 22 may also comprise a number of additional systems and devices, such as one or more power plants, electrical systems, hydraulic systems, pneumatic systems, etc. (not shown), that may be required or desired for the operation of the particular power shovel 22. However, because such additional systems and devices are well known in the art and are not required to understand or implement the present invention, such additional systems and devices that may be utilized in any particular power shovel 22 will not be described in further detail herein.

Figure 6:
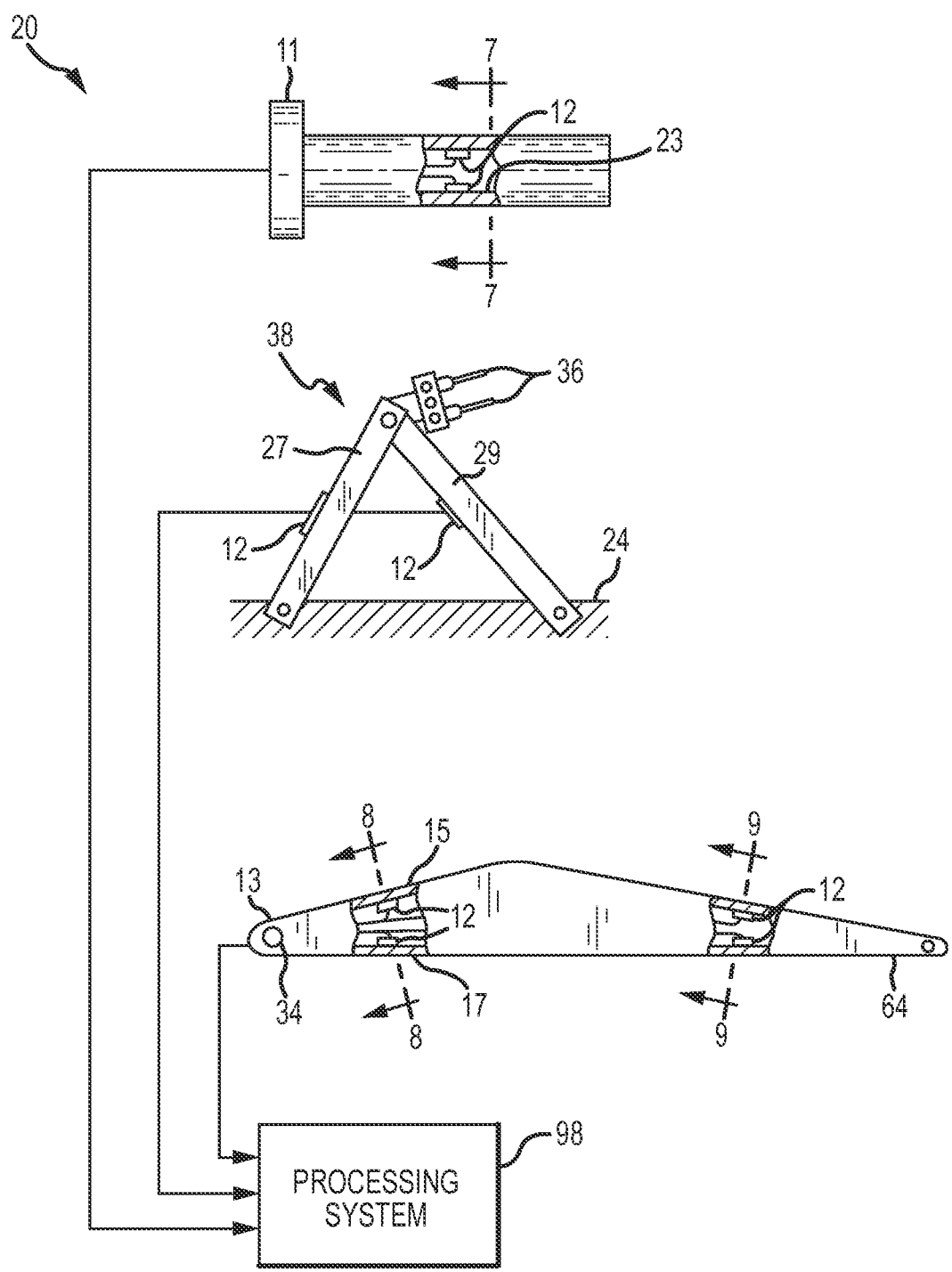
FIG. 6 is an illustration of a load sensing system according to one embodiment of the invention showing the placement of strain transducers on various members of the power shovel.

Referring now to FIGS. 2 and 6, the boom calibration system 10 may also comprise a load sensing system 20 and a machine control system 70. Load sensing system 20 provides a means for determining various member joint loads imposed on shovel 22. In one embodiment, the load sensing system 20 is operatively connected to a plurality of strain transducers 12 mounted to various structural members 14 of the shovel 22. Load sensing system 20 may also include a processing system 98. The strain transducers 12 sense strain in various members 14 of the shovel 22. Processing system 98 may be programmed or configured to determine the loads imposed on the various member joints of the shovel 22 based on the strain measured or sensed by the various strain transducers 12 and the curve fit parameters from boom calibration system 10.

The various member joint loads can be determined from strain transducers 12 mounted on various structural members 14 of power shovel 22. For example, in the particular embodiment shown and described herein, strain transducers 12 are mounted on various members of boom 32, back stay assembly 38, and sheave pin 11.

More specifically, a first or lower set of strain transducers 12 may be mounted near a lower of proximal end 13 of boom 32, as indicated by the line 8-8 in FIG. 6. Similarly, a second or upper set of strain transducers 12 may be mounted near the upper or distal end 64 of boom 32, as indicated by the line 9-9 in FIG. 6. The arrangement is such that the first and second sets of strain transducers 12 are mounted on opposite sides of the saddle block assembly 42 (not shown in FIG. 6, but shown in FIGS. 1 and 5).

Figure 8:
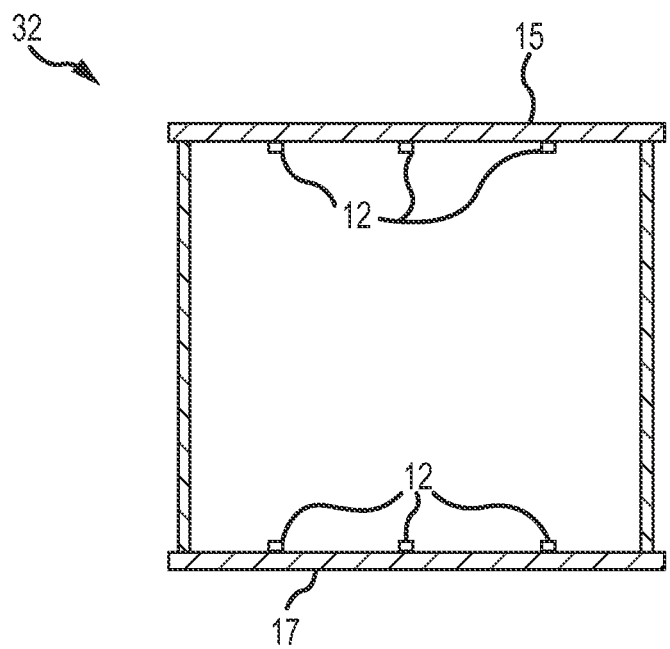
FIG. 8 is a cross-sectional view in elevation of a lower section of the boom taken along the line 8-8 of FIG. 6 more clearly showing the positional relationship of various strain transducers mounted thereto.

With reference now to FIGS. 6 and 8, the first or lower set of strain transducers 12 may be mounted to the top and bottom plates 15 and 17 of boom 32. In one embodiment, at least one, preferably two, and more preferably three, strain transducers 12 may be mounted to the top plate 15 of boom 32 in generally spaced-apart relation, as best seen in FIG. 8. Similarly, at least one, preferably two, and more preferably three, strain transducers 12 may be mounted to the bottom plate 17 of boom 32, also in generally spaced-apart relation. The strain transducers 12 mounted to the top plate 15 of boom 32 sense or measure the strain in the top plate 15, whereas the strain transducers 12 mounted to the bottom plate 17 of boom 32 sense or measure the strain in the bottom plate 17.

Figure 9:
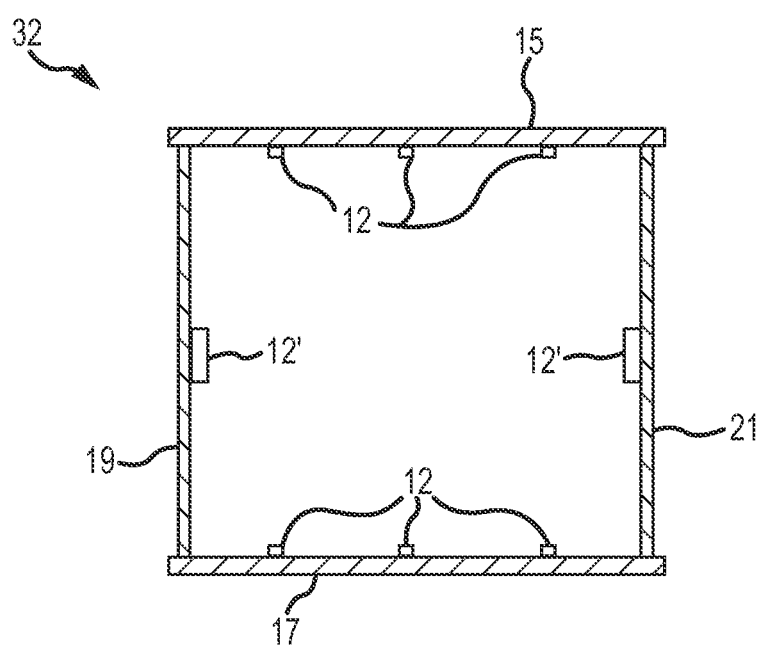
FIG. 9 is a cross-sectional view in elevation of an upper section of the boom taken along the line 9-9 of FIG. 6 more clearly showing the positional relationship of various strain transducers mounted thereto.

The second or upper set of strain transducers 12 are also mounted to the top and bottom plates 15 and 17 of boom 32, but at positions located near the upper or proximal end 64 of boom 32, as best seen with reference to FIGS. 6 and 9. Here again, at least one, preferably two or even three, strain transducers 12 may be mounted to each of the top and bottom plates 15 and 17, as best seen in FIG. 9. The strain transducers 12 mounted to the top and bottom plates 15 and 17 of boom 32 sense or measure the strain in the top and bottom plates 15 and 17, respectively. In addition, an optional set of strain transducers 12' may be mounted to the left and right side plates 19 and 21 of boom 32. If provided, the additional strain transducers 12' may be used to measure or determine shear flow in the upper portion of the boom 32 due to torsional loadings on boom 32.

Figure 7:
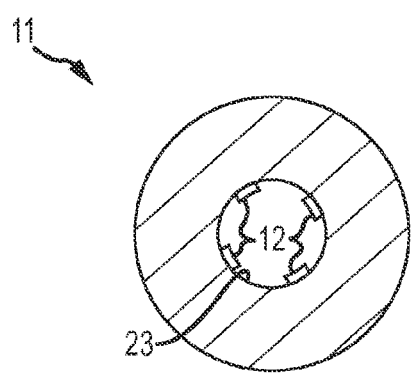
FIG. 7 is a cross-sectional view in elevation of a sheave pin taken along the line 7-7 of FIG. 6 more clearly showing the positional relationship of various strain transducers mounted therein.

In some embodiments it may be desirable to mount additional strain transducers 12 to other members of shovel 22. For example, in one embodiment, additional strain transducers 12 may be mounted within an internal cavity 23 provided in sheave pin 11 that supports sheave 62, as best seen in FIGS. 6 and 7. Strain transducers 12 in sheave pin 11 sense or measure strain in the sheave pin 11, which may be used by processing system 98 to calculate or determine the loading imposed on sheave 62 as well as the tension 25 (FIG. 4) in hoist rope 60.

Other strain transducers 12 may be mounted to various members 27 and 29 of back stay assembly 38, as best seen in FIG. 6. The strain transducers 12 sense or measure the strain in the various members 27 and 29 of back stay assembly 38, which may be used by the processing system 98 to calculate or determine the loading imposed on back stay assembly 38, as well as the tension 31 (FIG. 5) in the suspension ropes 36. Each tension leg 27 of back stay assembly 38 may be provided with at least one and preferably two strain transducers 12. It is generally preferred, but not required, to instrument each tension leg 27 of back stay assembly 38. Instrumenting both tension legs 27 will generally allow for more accurate load determinations to be made as the load in each tension leg 27 may not be the same. Similarly, and if desired, each compression leg 29 of back stay assembly 38 also may be provided with at least one, and preferably two strain transducers 12.

Strain transducers 12 may comprise any of a wide range of strain transducers or strain gauges that are well-known in the art or that may be developed in the future that are or would be suitable for measuring or sensing strain in structural members. Consequently, the present invention should not be regarded as limited to use with any particular type or style of strain transducer. However, by way of example, in one embodiment, each of the strain transducers 12 and 12' may comprise strain transducers available from Bridge Diagnostics, Inc., of Boulder, Colo., US.

Still referring to FIG. 6, processing system 98 is operatively connected to the various strain transducers 12 and is programmed or configured to calculate or determine the various member joint loads based on the strain data received from the various strain transducers 12 and the curve fit parameters determined by boom calibration system 10.

In one embodiment, processing system 98 may comprise a general purpose programmable computer, such as a personal computer, that is programmed or configured to calculate the various member joint loads, to implement the various processes and steps described herein, and to interface with the machine control system 70 (FIG. 2). However, because such general purpose programmable computers are well known in the art and could be easily provided by persons having ordinary skill in the art after having become familiar with the teachings provided herein, the particular programmable computer system that may comprise processing system 98, as well as the particulars of the various programs or processes that may be implemented by processing system 98, will not be described in further detail herein.

As briefly described above, the boom calibration system 10 may also interface with a machine control system 70. Machine control system 70 may in turn interface with the load sensing system 20 and operates the various systems and actuators (e.g., the hoist actuator 66 and crowd actuator 52) of power shovel 22 in order to control the shovel 22 in accordance with the teachings provided herein. For example, in one embodiment the machine control system 70 may operate the various actuators of shovel 22 in various operational regimes so that the loads imposed on the various members during operation do not exceed the maximum permissible loadings for those members. Alternatively, other control schemes are possible, as would become apparent to persons having ordinary skill in the art after having become familiar with the teachings provided herein.

Before proceeding with the description it should be noted that, depending on the particular power shovel 22 on which the boom calibration system 10 is utilized, machine control system 70 may comprise all or a portion of an existing control system (not shown) that is used to operate the power shovel 22. Alternatively, a separate machine control system 70 may be provided, either to work in conjunction with such an existing control system or to replace the existing control system.

In an embodiment wherein the machine control system 70 comprises an existing shovel control system, load sensing system 20 may be configured or programmed to interface with the existing system so that the existing system can operate the shovel in accordance with the teachings described herein. The existing machine control system 70 may need to be reconfigured or reprogrammed as necessary to interface with the load sensing system 20 and to implement the various methods of the boom calibration system 10. In an embodiment wherein the machine control system 70 comprises or utilizes a portion of an existing shovel control system, then the machine control system 70 may include or be provided with a suitable auxiliary processing and interface system (not shown) to allow the load sensing system 20 to interface with the existing shovel control system. However, because the details of such methods and systems for interfacing with existing machine control systems would become apparent to persons having ordinary skill in the art after having become familiar with the teachings provided herein, the particular systems and methods that may be used to interface with an existing shovel control system will not be described in further detail herein.

Referring now to FIG. 3, the boom calibration system 10 may be operated in conjunction with method 18 to develop a plurality of curve fit parameters or calibration constants based on calculated structural loads and measured strains obtained over a wide range of loading conditions. In one embodiment, the range of loading conditions may be obtained by moving the various structural members 14 of machine 16 over a range of motion. See step 72. As the machine 16 is moved over a range of motion, the boom calibration system 10 calculates structural loads imposed on at least one structural member 14 of the machine 16 at step 74. It is generally preferred, but not required, that step 74 be performed while the machine 16 is in a structurally determinate position, thereby allowing the boom calibration system 10 to readily calculate the loads imposed on the various structural members 14 over a wide range of loading conditions.

For example, in the embodiment shown and described herein wherein the boom calibration system is used in conjunction with a power shovel 22, calculation process of step 74 may be performed by moving the shovel 22 over a series of simulated "air digs." In such a configuration, there are no external loadings on the shovel 22. Further, the weights and centroids of the various members of the shovel will be known (or can be readily determined) for such a configuration, as will the relative positioning of the various members to a defined coordinate system. Therefore, the various member joint loads can be easily determined when the shovel 22 is in such a state. In this regard it should be noted that the body forces or weights of the various members of the shovel 22 act vertically downward. Inclinometers (not shown) may be mounted to various locations of the shovel 22 to measure fore and aft inclination to correct for any tilt of the shovel 22. Alternatively, other devices and methods may be used to determine the relative positioning of the shovel 22 relative to the particular coordinate system involved, as would become apparent to persons having ordinary skill in the art after having become familiar with the teachings provided herein.

As mentioned, step 74 is performed to calculate a number of individual or discrete member loads for n individual or discrete positions as the shovel 22 is moved over the series of air digs. Step 78 involves measuring strains in the various structural members 14. This strain measuring process 78 may be performed for each of the n individual or discrete positions for which the various member loads were calculated in step 74. In this regard it should be noted that it is generally preferred that there be a one-to-one correspondence between the calculated load at any particular position during the simulated air digging cycle and the corresponding measured strains.

Once the various loads and strains have been calculated and measured (e.g., during steps 74 and 78), method 18 then determines a plurality of curve fit parameters at step 80. The curve fit parameters are determined from the calculated structural loads (obtained during step 74) and the corresponding measured strains (obtained during step 78) at each of the n individual or discrete positions for which those values were obtained. The various curve fit parameters may be derived from either a first degree polynomial fit or a multilinear fit depending on the particular structural member involved.

By way of example, in the particular embodiment shown and described herein, a first degree polynomial fit is used for the tension leg calibration as follows:

$$\varepsilon = a_0 + a_1 \cdot F \quad (1)$$

where:
 $\varepsilon$ is the strain in the member;
 $a_0$ and $a_1$ are the curve fit parameters or calibration constants; and
 F is the axial force in the structural member.

In contrast, the upper and lower boom calibrations will be modeled as a multilinear fit:

$$\varepsilon = a_0 + a_1 F_x \cdot a_2 F_y \quad (2)$$

where:
 $\varepsilon$ is the strain in the member;
 $a_0$, $a_1$, and $a_2$ are the curve fit parameters or calibration constants; and
 $F_x$ and $F_y$ are the joint reaction forces in the member.

With reference now to FIGS. 1 and 6, the strain sensors 12 in back stay assembly 38 may be calibrated by determining the tension 31 ($T_s$ in the equations) in the suspension ropes 36 during the statically determinate air digs of shovel 22 for n positions during the air digs. The strain $\varepsilon'$ in tension leg 27 (FIG. 6) due to an axial force P in the tension leg 27 is given by:

$$\varepsilon' = (\varepsilon + \varepsilon^0) = k_1 P/AE + \varepsilon_0 \quad (3)$$

where $k_1$ is a constant which accounts for any strain transducer installation effects. Further, over the short duration of the air dig cycles, any temperature drift in the transducer 12 is negligible, i.e., $\varepsilon^t = 0$. AE is the product of cross-sectional area and elastic modulus for the structural member (e.g., tension leg 27). Thus, in equation (3) the only variable is the axial force P. However, the axial force P in tension leg 27 is a function of the tension 31 (i.e., $T_s$) in the suspension or equalizer ropes 36. Therefore, the first degree polynomial for developing the curve fit parameters is:

$$\varepsilon = a_0 + a_1 \cdot T_s \quad (4)$$

Thus, over the series of air digs, method 18 may obtain n measurements of strain in the tension leg transducer 12 and n corresponding calculations of the tension 31 ($T_s$) in the equalizer ropes 36 from a statically determinate free-body diagram for the member:

$$[\varepsilon']_{n \times 1} = a_0 + a_1 \cdot [T_s]_{n \times 1} \quad (5)$$

Where $\varepsilon'$ is the expected strain measured by the calibrated transducers 12. The curve fit parameters or calibration constants $a_0$ and $a_1$ may be determined using standard numerical techniques. If desired, a temperature correction factor $\varepsilon^t$ may be added.

Thereafter, the tension 31 (i.e., $T_s$) in the suspension or equalizer ropes 36 may be determined from the calibrated measured strain $\varepsilon'$ (e.g., during normal machine operation) as follows:

$$T_s = (\varepsilon' - a_0 \pm \varepsilon^t)/a_1 \quad (6)$$

Figure 14:
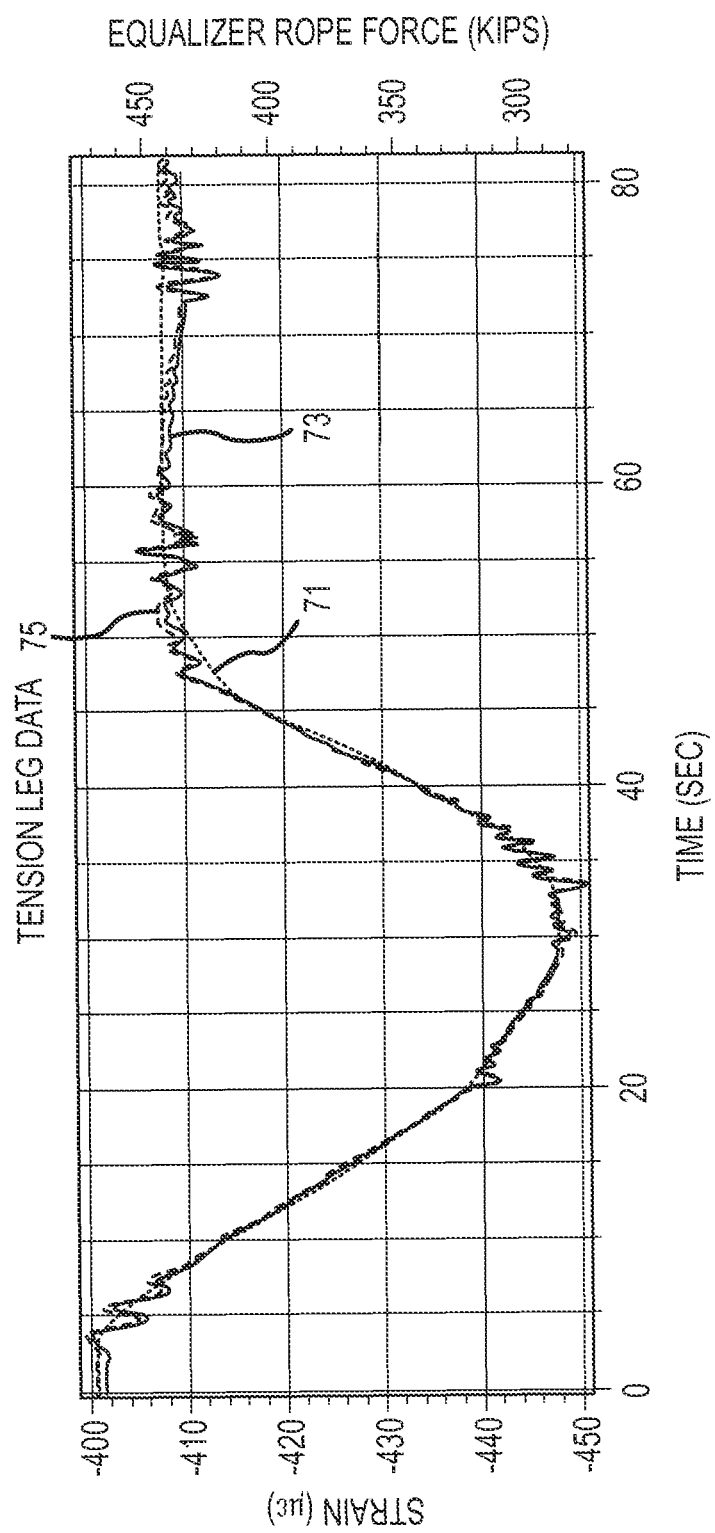
FIG. 14 is a plot of the calibration results obtained by calibrating strain sensors in the back stay assembly in accordance with the teachings provided herein.

Example calibration results for the sensors 12 in the tension leg 27 in back stay assembly 38 are illustrated in FIG. 14. Specifically curve 71 is the calculated tension (i.e., as determined in step 74) in the equalizer rope 36 based on a structurally determinate configuration as the shovel 22 was moved through a range of motion. Curve 73 is the actual measured strain data from the strain transducers 12 in the tension leg 27 (i.e., as determined in step 78). Equation 5 was then used to determine (i.e., in step 80) the curve fit parameters $a_0$ and $a_1$ from the calculated tension $T_s$ and the measured strain values $\varepsilon'$. Thereafter, the recovered equalizer rope tension (i.e., as determined in step 86), represented by curve 75 in FIG. 14, is then obtained from Equation 6 based on the measured strain $\varepsilon'$ (i.e., as determined in step 84) and the curve fit parameters $a_0$ and $a_1$ determined in step 80. As illustrated in FIG. 14, the boom calibration system 10 of the present invention provides for the highly accurate determination of member loads from measured strains over a wide range of loadings of the tension legs 27.

The curve fit parameters for the boom 32 may be derived in a similar manner, but from a multilinear fit based on the reaction forces $F_x$ and $F_y$ on the various boom joints (e.g., the boom foot joint 34 and the boom point sheave pivot pin 11). As will be described in more detail below, the calibration process is performed separately for upper and lower portions of the boom 32. As described below, superposition may be used to calculate the expected strain at each of the transducers 12 provided in boom 32. Moreover, the analysis should take into account variations in the mounting positions of the various strain sensors 12 that may depart from the 'idealized' positions illustrated in FIGS. 8 and 9.

Figure 10:
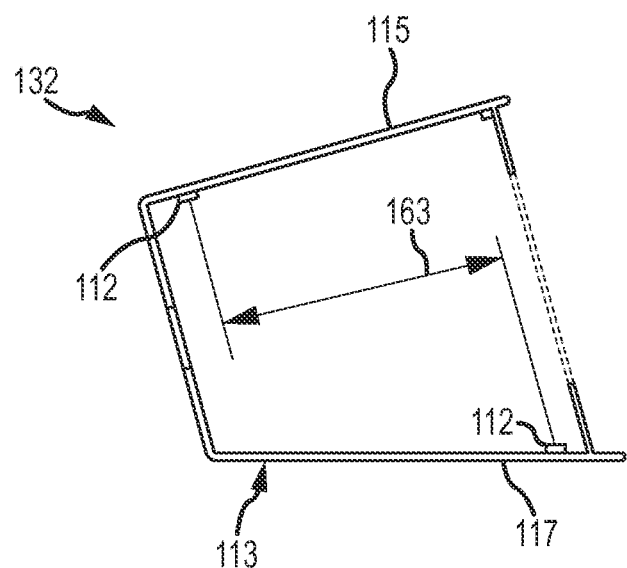
FIG. 10 is a cross-sectional side view in elevation of a lower section of an in-service boom showing displaced positioning of various strain transducers due to the presence of various internal components.
Figure 11:
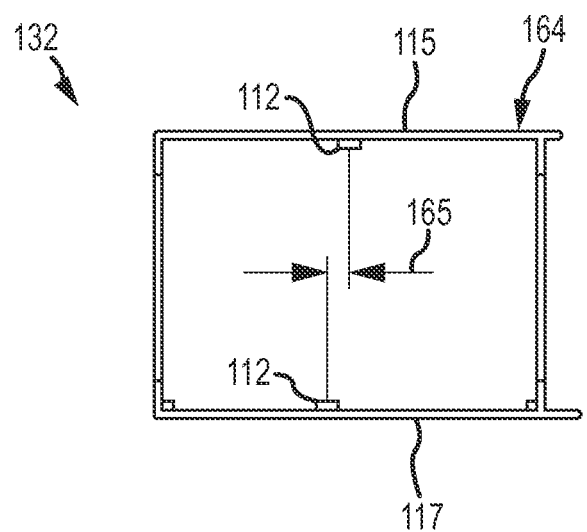
FIG. 11 is a cross-sectional side view in elevation of an upper section of an in-service boom showing displaced positioning of various strain transducers due to the presence of various internal components.

For example, and with reference now to FIGS. 10 and 11, a field installation of various strain transducers 112 in an existing boom 132 may not permit the strain transducers 112 to be mounted in alignment with one another (i.e., compared to the mounting arrangements illustrated in FIGS. 8 and 9). Further, such field misalignments may vary depending on the location in the boom 132, i.e., between the lower and upper strain transducer mounting locations 113 and 164 in the boom 132.

Referring now primarily to FIG. 10, in an actual field installation, the strain transducers 112 mounted to the top plate 115 of the lower portion 113 of boom 132 are displaced or offset by a distance 163 compared to the strain transducers 112 mounted to the lower plate 117. The offset distance 163 was required due to the presence of compression buckling of the lower plate 117 of boom 132. Similarly, and with reference now to FIG. 11, the strain transducers 112 mounted to the top and bottom plates 115 and 117 of the upper portion 164 of boom 132 are displaced or offset from one another by a distance 165. In this case, the displacement arose due to the presence of internal lubrication piping within the boom 132.

If a particular installation involves such an offset of the various strain transducers 112, then the offset must be compensated or taken into account so the various loadings determined from the sensed strains are accurate. In one embodiment, the offset of the various strain transducers 112 may be compensated by developing calibration constants at each transducer 112 based on the cross-section acting at each specific transducer 112. The calculated total strains $\varepsilon_t$ and $\varepsilon_b$ (i.e., in respective top and bottom plates 115 and 117) at the cross-section of a single boom transducer 112 due to assumed joint forces $F_x$ and $F_y$, is given by Equations 7 and 8 (assuming superposition):

$$\epsilon_t = \frac{k_1 P}{AE} + \frac{k_2 M c_t}{IE} = \frac{k_1 F_x}{AE} + \frac{k_2 (F_y d_1) c_t}{IE} \quad (7)$$

$$\epsilon_b = \frac{k_3 P}{AE} - \frac{k_4 M c_b}{IE} = \frac{k_3 F_x}{AE} - \frac{k_4 (F_y d_2) c_b}{IE} \quad (8)$$

Significantly, all of the constant terms at each transducer 112, i.e., material and geometry unknowns, can be combined into a single constant. The values of the various constant terms do not change over time and only need to be calculated at initial start up. Accordingly, the terms of the matrix [A] in Equations 15 and 19, below, include terms for the top and bottom plates 115, 117 as follows:

$$A_{11} = \frac{k_1}{AE} \quad (9)$$

$$A_{12} = \frac{k_2 d_1 c_1}{IE} \quad (10)$$

$$A_{21} = \frac{k_3}{AE} \quad (11)$$

$$A_{22} = -\frac{k_4 d_2 c_b}{IE} \quad (12)$$

This follows the general form where it is necessary to account for an initial unknown strain offset at each strain transducer 112 due to $$\varepsilon = \alpha_0 + \alpha_1 F_x + \alpha_2 F_y \quad (13)$$

As explained in further detail below, the terms $a_0$, $a_1$, and $a_2$ can be solved with a series of known strains and corresponding calculatedrces from a simulated air dig. That is, n measurements of strain are acquired for each of m transducers 112. A corresponding number n of calculated joint forces $F_x$ and $F_y$ may be obtained from a structurally determinate free body diagram. The multilinear fit given by the form of Equation 13 may then be used to determine $a_0$, $a_1$, and $a_2$. These terms then go into the matrix [A] of Equations 15 and 19, below, based on whether the strain transducer 112 is in the top or bottom plate 115 or 117. For the top plate 115, the calibration constants $a_0$ and $a_1$ correspond to $A_{11}$ and $A_{12}$. Similarly, the calibration constants $a_0$ and $a_1$ for the bottom plate 117 correspond to $A_{21}$ and $A_{22}$ in Equations 15 and 19.

Continuing now with the description, for the transducers 12 in the upper portion of the boom 32, the moment arm for the bending strain is with respect to the center of the boom point sheave pin 11. In addition, for the upper portion of boom 32 the joint forces include contributions from forces from the boom point sheave pin 11 (e.g., resulting from the tension in the hoist rope 60) as well as the tension $T_s$ in the suspension ropes 36.

Thus, for the upper section of boom 32, method 18 may obtain n measurements of strain at m transducers 12 in the upper portion of boom 32 and corresponding force components as follows:

$$[\varepsilon']_{n \times m} = a_0 + a_1 \cdot [F_x^e + F_x^s]_{n \times m} + a_2 \cdot [F_y^e + F_y^s]_{n \times m} \quad (14)$$

where:

$\varepsilon'$ is the expected strain measured by the calibrated transducers 12;

$F_x^e$ and $F_y^e$ are the recovered components of the tension $T_s$ in the suspension ropes 36 from the calibrated transducers 12 in back stay assembly 38; and $F_x^s$ and $F_y^s$ are the calculated sheave reaction force components from an evaluation of statically determinate free body diagrams.

If desired, a temperature correction factor $\varepsilon^t$ may be added. The curve fit parameters or calibration constants $a_0$, $a_1$, and $a_2$ may be determined using standard numerical techniques.

After the calibration constants for the upper boom transducers have been determined, the upper boom joint forces may be recovered or calculated from the calibrated strains. In order to simplify the calculations for the upper portion of boom 32, the calculated tension 31 ($T_s$) in the suspension rope 36 (e.g., from Equation 6) may be used to remove its effect from the boom transducers 12. This will allow for a more accurate determination of the tension 25 ($T_p$) in the hoist rope 60. More specifically, the tension $T_s$ in the suspension rope 36 may be resolved into horizontal and vertical components ($F_x^e$ and $F_y^e$) acting at the center of the boom point sheave pin 11. The strain imposed on the upper boom transducers 12 can then be determined from the forces acting on the sheave pin 11. This strain can then be subtracted from the measured strain at each transducer 12. The remaining strain in the upper section of boom 32 will then be due solely to the tension in the hoist rope 60.

For an embodiment having two strain transducers 12 on the top and bottom plates 15 and 17, the sheave pin reaction forces $F_x^s$ and $F_y^s$ due to the tension in the hoist rope 60 are then given by Equation 15:

$$\begin{bmatrix} F_x^s \\ F_y^s \end{bmatrix}_{2 \times 1} = \quad (15)$$

$$(A_{2\times4}^T A_{4\times2})^{-1} A_{2\times4}^T \left( \begin{bmatrix} \varepsilon_1^T \\ \varepsilon_2^T \\ \varepsilon_3^B \\ \varepsilon_4^B \end{bmatrix} - \begin{bmatrix} (a_0)_1^T \\ (a_0)_2^T \\ (b_0)_1^B \\ (b_0)_2^B \end{bmatrix} - \begin{bmatrix} (\Delta \varepsilon^t)_1^T \\ (\Delta \varepsilon^t)_2^T \\ (\Delta \varepsilon^t)_1^B \\ (\Delta \varepsilon^t)_2^B \end{bmatrix} - A_{4\times 2} \begin{bmatrix} F_x^e \\ F_y^e \end{bmatrix}_{2 \times 1} \right)_{4 \times 1}$$

If desired, a temperature correction factor $\varepsilon^t$ may be added.

Figure 15A:
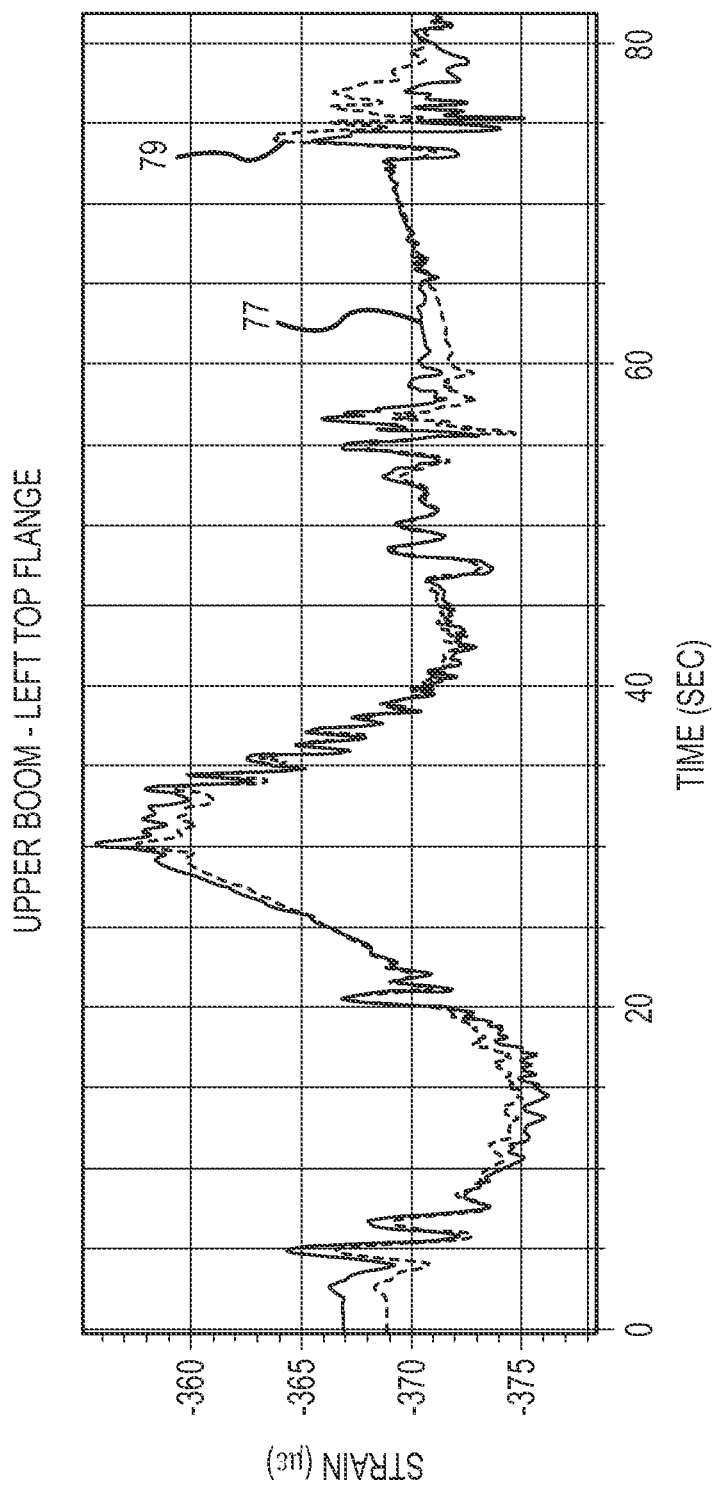
FIGS. 15(a) and (b) are plots of the calibration results obtained for strain sensors mounted to respective top and bottom flanges of the upper portion of the boom.
Figure 15B:
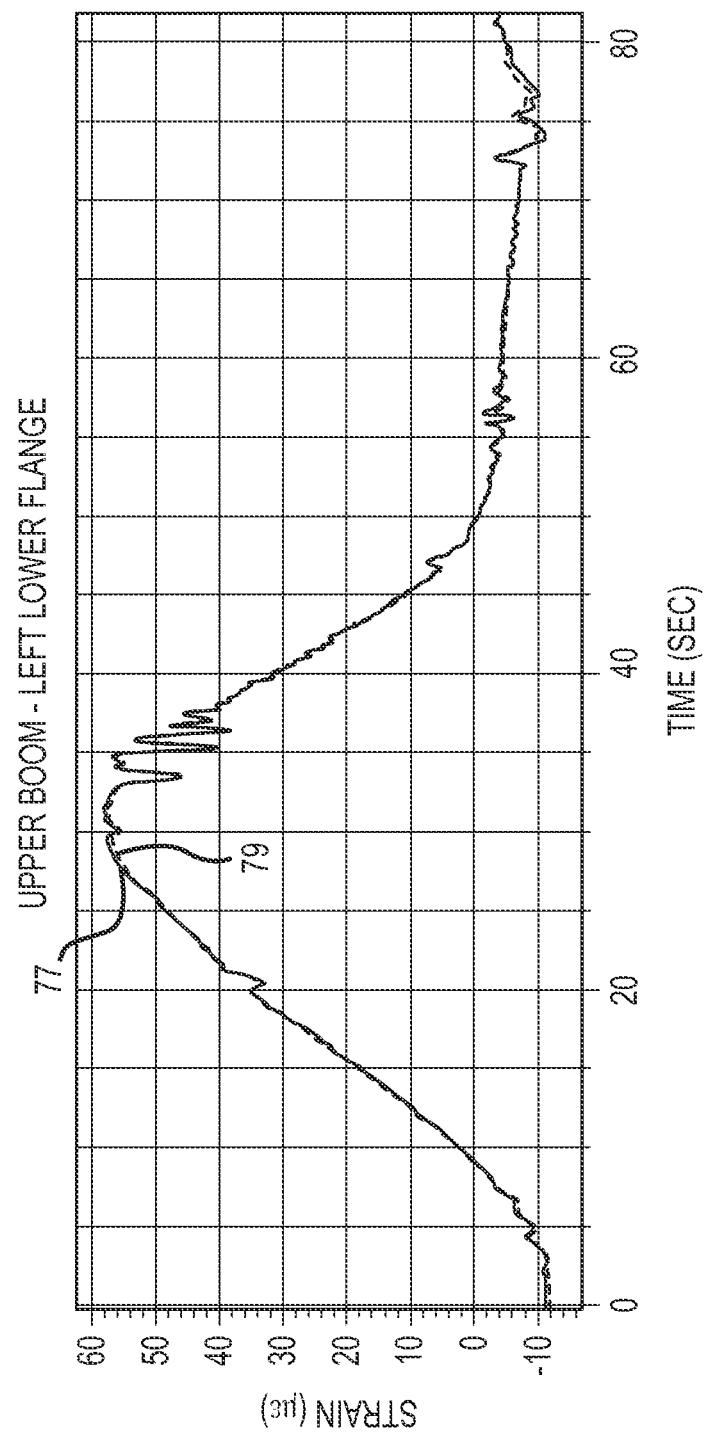

Example calibration results for the sensors 12 in the upper portion of boom 32 are illustrated in FIGS. 15(a) and 15(b). More specifically, the calibration results illustrated in FIG. 15(a) are for the sensors 12 mounted to the top flange 15 of the upper portion of boom 32, whereas the calibration results illustrated in FIG. 15(b) are for the sensors 12 mounted to the bottom flange 17 of the upper portion of boom 32. Curve 77 in FIG. 15(a) is the actual measured strain data from the strain transducers 12 in the top flange 15 of the upper portion of boom 32 (i.e., as determined in step 78). Equation 14 was then used to determine (i.e., in step 80) the curve fit parameters $a_0$, $a_1$, and $a_2$ from the recovered force components of the tension $T_s$, the calculated sheave reaction force components, and the measured strain values $\varepsilon'$. Thereafter, the recovered sheave pin reaction forces (i.e., as determined in step 86), represented by curve 79 in FIGS. 15(a) and (b), are then obtained from Equation 15 based on the measured strain $\varepsilon'$ (i.e., as determined in step 84) and the curve fit parameters $a_0$, $a_1$, and $a_2$ determined in step 80. As illustrated in FIGS. 15(a) and (b), the boom calibration system of the present invention provides for the highly accurate determination of member loads from measured strains over a wide range of loadings of the upper boom section.

Figure 12:
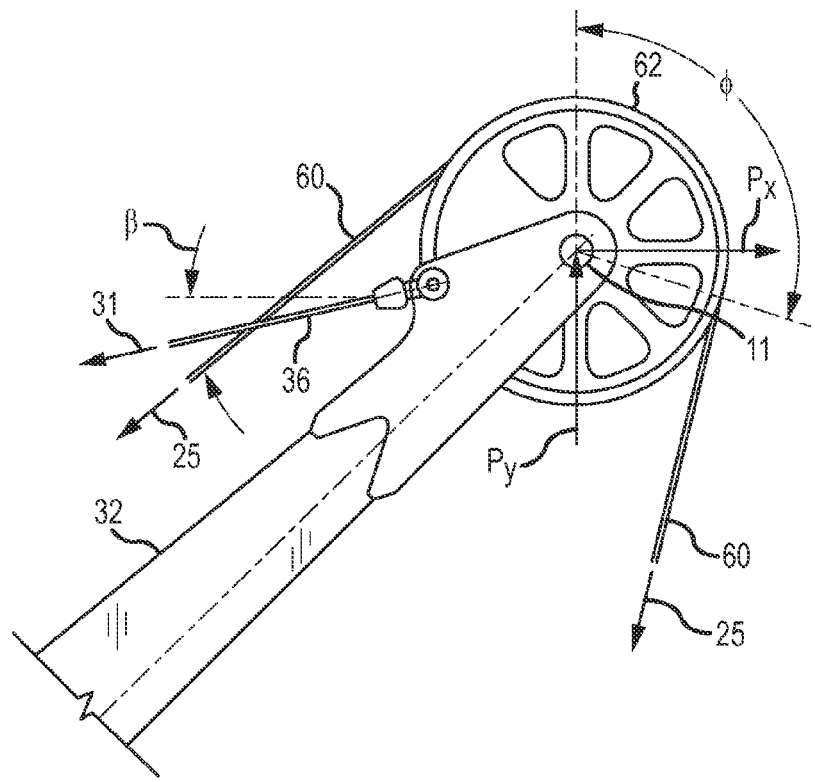
FIG. 12 is a free-body diagram of the boom point sheave system showing the hoist and suspension rope tensions that may be determined from the strain transducers located in the upper section of the boom.

The tension 25 ($T_p$) in the hoist rope 60 as well as its wrap angle $\beta$ around the boom sheave 62 may be determined from the recovered upper boom joint forces. With reference now to FIG. 12, the horizontal and vertical forces $P_x$ and $P_y$ at the sheave pin 11 and the angle $\beta$ the hoist rope 60 makes with the horizontal plane may be used to determine the tension 25 ($T_p$) in the hoist rope 60 as well as the wrap angle $\varphi$ around the sheave 62 from the following two equations:

$$P_x - T_p \cos \beta + T_p \cos \varphi = 0 \quad (16)$$

$$P_y - T_p \sin \beta - T_p \sin \varphi = 0 \quad (17)$$

Equations 16 and 17 may be solved by a nonlinear minimization technique.

The curve fit parameters for the lower section of boom 32 may be obtained in a manner similar to that used for the upper section of boom 32, except that the joint forces are simply those at foot joint 34. Thus, over a series of air digs, boom calibration system method 18 may obtain n measurements of strain at m transducers 12 in the lower section of boom 32 as follows:

$$[\varepsilon']_{n \times m} = a_0 + a_1 \cdot [B_x]_{n \times m} + a_2 \cdot [B_y]_{n \times m} \quad (18)$$

where:

$\varepsilon'$ is the expected strain measured by the calibrated transducers 12;

$B_x$ and $B_y$ are the boom foot reactions 35 and 33 in the boom coordinate system. See FIG. 5.

If desired, a temperature correction factor $\varepsilon^t$ may be added. Again, the curve fit parameters or calibration constants $a_0$, $a_1$, and $a_2$ may be determined using standard numerical techniques.

The boom foot reaction forces $B_x$ and $B_y$ may then be determined or recovered from the calibrated measured strain in two top and two bottom flange strain transducers from Equation 19:

$$\begin{bmatrix} B_x \\ B_y \end{bmatrix}_{2\times 1} = (A_{2\times 4}^T A_{4\times 2})^{-1} A_{2\times 4}^T \left( \begin{bmatrix} \epsilon_1^T \\ \epsilon_2^T \\ \epsilon_3^B \\ \epsilon_4^B \end{bmatrix} - \begin{bmatrix} (a_0)_1^T \\ (a_0)_2^T \\ (b_0)_1^B \\ (b_0)_2^B \end{bmatrix} - \begin{bmatrix} (\Delta\varepsilon')_1^T \\ (\Delta\varepsilon')_2^T \\ (\Delta\varepsilon')_1^B \\ (\Delta\varepsilon')_2^B \end{bmatrix} \right)_{4\times 1} \quad (19)$$

Figure 16A:
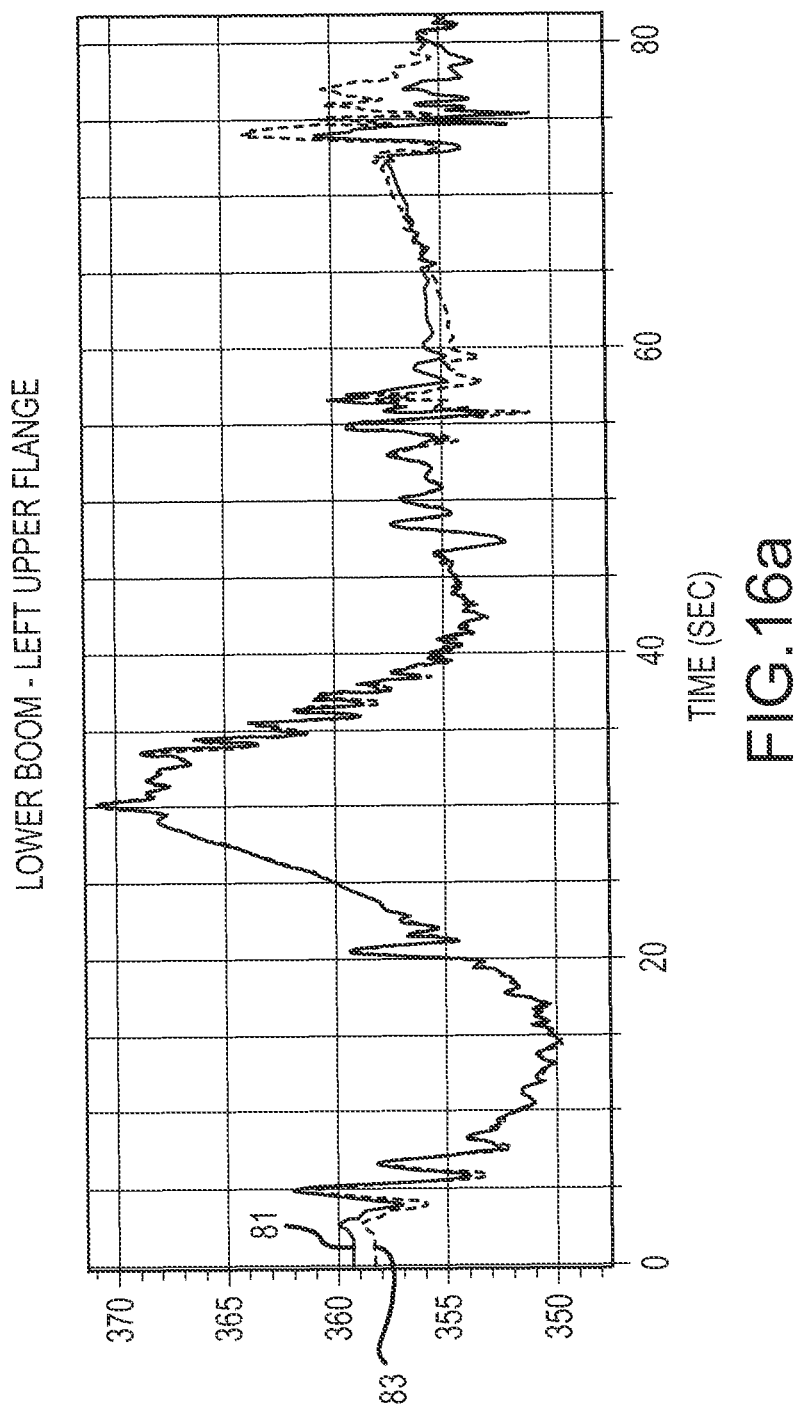
FIGS. 16(a) and (b) are plots of the calibration results obtained for strain sensors mounted to respective top and bottom flanges of the lower portion of the boom.
Figure 16B:
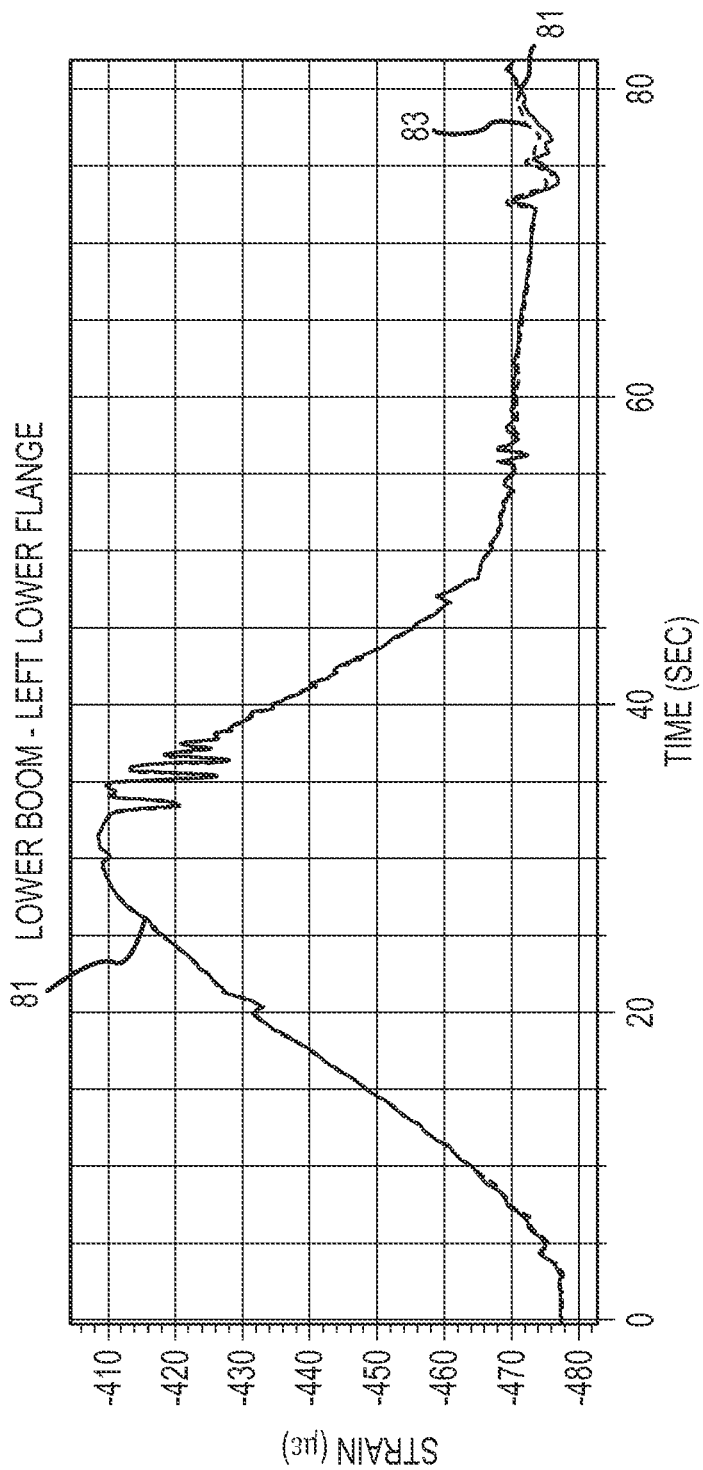

Example calibration results for the sensors 12 in the lower portion of boom 32 are illustrated in FIGS. 16(a) and 16(b). In particular, the calibration results illustrated in FIG. 16(a) are for the sensors 12 mounted to the top flange 15 of the lower portion of boom 32, whereas the calibration results illustrated in FIG. 16(b) are for the sensors 12 mounted to the bottom flange 17 of the lower portion of boom 32. Curve 81 in FIG. 16(a) is the actual measured strain data from the strain transducers 12 in the top flange 15 of the lower portion of boom 32 (i.e., as determined in step 78). Equation 18 was then used to determine (i.e., in step 80) the curve fit parameters $a_0$, $a_1$, and $a_2$ from the calculated boom foot reactions and the measured strain values $\varepsilon'$. Thereafter, the recovered boom foot reaction forces (i.e., as determined in step 86), represented by curve 83 in FIGS. 16(a) and (b), are then obtained from Equation 19 based on the measured strain $\varepsilon'$ (i.e., as determined in step 84) and the curve fit parameters $a_0$, $a_1$, and $a_2$ determined in step 80. As illustrated in FIGS. 16(a) and (b), the boom calibration system 10 of the present invention provides for the highly accurate determination of member loads from measured strains over a wide range of loadings of the lower boom section.

Once the curve fit parameters for the various strain sensors 12 have been obtained, load sensing system 20 may operate in accordance with method 82 to determine or recover the actual structural loads imposed on the various structural members 14 of the machine 16 during normal operation. In the embodiment shown and described herein, load sensing system 20 may determine or recover the actual structural loads on the various structural members 14 on a substantially continuous basis, i.e., in real time. A first step 84 in method 82 may involve the measurement of the strain in the various structural members 14 of the machine 16. This may be done via processing system 98 which is operatively connected to the various strain transducers 12. See FIG. 6. The recovered or actual loads imposed on the various structural members 14 may then be determined at step 86 based on the measured strain and on the curve fit parameters or calibration constants determined in step 80.

For example, the tension $T_s$ in the suspension or equalizer ropes 36 may be determined from equation (6). The sheave pin reaction forces may be recovered or determined from equation (8), while the boom foot reaction forces may be recovered or determined from equation (10).

Figure 13:
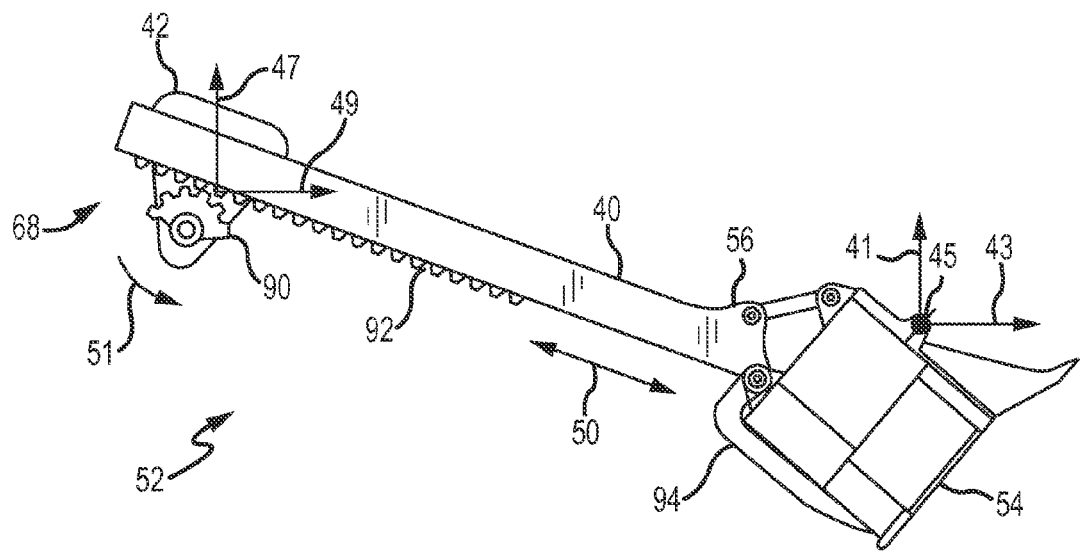
FIG. 13 is a statically determinate free body diagram of a handle-dipper system.

Once the forces in the suspension ropes 36 and the boom 32 have been determined, as described above, they may be used to determine the forces and loads in various other structural members 14 of the machine 16. For example, and with reference now primarily to FIG. 5, exemplary maximum member joint loads that may be determined include, but are not limited to, the reaction forces 33 and 35 at the boom foot joint 34, reaction forces 37 and 39 at the saddle block pivot joint 46, and reaction forces 41 and 43 at the bail pin 45. Additional loads that may be determined for the maximum load case include the tensions 25 and 31 in the hoist and suspension ropes 60 and 36, the tension and compression forces (not shown) in the various members 27 and 29 of back stay assembly 38 (FIG. 6), as well as the reaction forces 47, 49 and torque 51 at the drive pinion 90 (FIG. 13).

The various joint loads may be determined by an appropriate structural analysis of the various members of the power shovel 22 in accordance with the teachings provided herein, as would become apparent to persons having ordinary skill in the art after having become familiar with the teachings provided herein. Consequently, the particular structural analysis that may be used to determine the various member joint loads in one embodiment will not be discussed in further detail herein.

Referring back now to FIG. 4, the method 82 may proceed to step 88 which may involve operation of the shovel 22 in accordance with the recovered joint loads. As described herein, the various member joint loads may be determined and/or monitored during shovel operation (i.e., "on the fly") by the load sensing system 20 based on the sensed strains in the various structural members as well as on the various curve fit parameters. For example, the load sensing system 20 and machine control system 70 may be programmed or configured to operate the machine 16 so as to prevent the loads from exceeding maximum specified limits for each structural member 14. In other embodiments, the recovered loads may be used by the machine control system 70 to maximize the performance of the machine in a desired operational regime. In still other embodiments, the recovered loads may be used to provide real time fatigue monitoring of various machine components or may be used to otherwise characterize the performance of the machine or machine operator.

Having herein set forth preferred embodiments of the present invention, it is anticipated that suitable modifications can be made thereto which will nonetheless remain within the scope of the invention. The invention shall therefore only be construed in accordance with the following claims:

What is claimed is:

1. A method of operating a machine comprising a bucket and strain sensors operatively associated with the machine, comprising:
    calibrating the strain sensors by:
        moving the machine over a range of n positions while the bucket is empty, each of the n positions corresponding to n loading conditions, said moving prohibiting the bucket from surface contact;
        calculating, for each of n loading conditions, at least one structural load associated with at least one member of the machine to produce n calculated structural loads corresponding to the n loading conditions;
        for each of n machine positions, using the sensors to measure at least one strain associated with the at least one member of the machine to produce n measured strains corresponding to the n loading conditions; and
        determining curve fit parameters from said n calculated structural loads and said n measured strains, the curve fit parameters relating measured strain and structural loads over n loading conditions;
    after said determining curve fit parameters, using the strain sensors to sense at least one sensed strain in at least one member of the machine;
    during real time operation of the machine, determining an actual load associated with the at least one member of the machine based on the sensed strain and the curve fit parameters; and using the actual load, operating the machine so a predetermined maximum permissible load for the at least one member is not exceeded.

2. The method of claim 1, wherein said calculating is performed when the at least one member of the machine is in a structurally determinate position.

3. The method of claim 1, wherein said curve fit parameters are derived from a first degree polynomial fit.

4. The method of claim 1, wherein said curve fit parameters are derived from a multilinear fit.

5. The method of claim 1, wherein said calculating further comprises calculating a tension load in an equalizer rope for each of the n positions.

6. The method of claim 5, wherein said measuring further comprises using the sensors to measure a strain in at least one tension leg operatively associated with the equalizer rope for each of the n positions.

7. The method of claim 5, wherein said calculating further comprises calculating a sheave pin reaction force in an upper section of a boom and wherein said using the sensors to measure further comprises using the sensors to measure a strain in the upper section of the boom.

8. The method of any of claim 7, wherein said determining said curve fit parameters is based on the sheave pin reaction force for in the upper section of the boom, the measured strain in the upper section of the boom, and the tension load in the equalizer rope.

9. The method of claim 5, wherein said calculating further comprises calculating a tension load in an equalizer rope for each of the n positions and calculating a foot joint reaction force in a lower section of the boom and wherein said measuring using the sensors to measure further comprises using the sensors to measure measuring a strain in the lower section of the boom.

10. The method of claim 1, further comprising:
determining a temperature correction factor; and
using the temperature correction factor in said determining of said recovered force.

11. The method of claim 1, wherein said measuring after determining the curve fit parameters is conducted when the machine is in a structurally indeterminate position.

12. A method of operating a digging machine, comprising:
while a bucket of the digging machine is empty and prevented from surface contact, moving the digging machine over a range of n simulated digging positions, each of the n positions corresponding to n loading conditions;
calibrating at least one tension leg strain transducer mounted to a tension leg in a back stay assembly of the digging machine by:
calculating, for each of n machine positions at least one tension load in an equalizer rope operatively connected to the tension leg to produce n tension loads corresponding to the n machine positions;
measuring, for each of n machine positions, at least one strain in the tension leg to produce n tension leg strains corresponding to the n machine positions; and
determining tension leg curve fit parameters from the n tension loads and the n tension leg strains;
calibrating at least one boom transducer mounted on a distal end of a boom and at least one boom transducer mounted on a proximal end of the boom of the digging machine by:
calculating, for each of n machine positions, at least one boom load corresponding to the n machine positions;
measuring, for each of n machine positions, at least one strain in the boom to produce n boom strains corresponding to the n machine positions; and
determining boom curve fit parameters from the n boom loads and the n boom strains;
after said calibrating of the tension leg strain transducer and during operation of the digging machine, measuring a strain in the tension leg;
after said calibrating of the boom transducer and during operation of the digging machine, measuring a strain in the boom;
during operation of the digging machine, determining a magnitude of a recovered load in the boom based on the measured strain in the tension leg, the measured strain in the boom, the tension leg curve fit parameters, and the boom curve fit parameters; and
operating the digging machine based on the recovered load in the boom so the recovered load in the boom does not exceed a predetermined maximum permissible load for the boom.

13. The method of claim 12, further comprising, determining at least one of a boom foot reaction force, a crowd pinion reaction force, a crowd pinion torque, a bail pin reaction force, a hoist rope tension, an equalizer rope tension, a dipper cutting force, a force at the face of a dipper, and a dipper payload.

14. The method of claim 12, wherein said tension leg curve fit parameters are derived from a first degree polynomial fit.

15. The method of claim 12, wherein said boom curve fit parameters are derived from a multilinear fit.

16. The method of claim 12, wherein determining curve fit parameters is done numerically.

17. A boom calibration system for a power shovel having a boom, comprising:
a load sensing system, said load sensing system comprising:
a set of lower strain transducers mounted to a proximal end of the boom and a set of upper strain transducers mounted to a distal end of the boom, said strain transducers being configured to measure strain in the boom to produce n measured strains corresponding to n loading conditions, said n loading conditions corresponding to n shovel positions, the n shovel positions being determined from a range of n simulated digging positions occupied by an empty bucket of the shovel that is prevented from surface contact, and to produce at least one sensed strain in the boom during real-time shovel operations; and
a processing system operatively associated with the upper and lower strain transducers, said processing system being configured to calculate n structural loads corresponding to the n loading conditions, determine curve fit parameters from said n calculated structural loads and said n measured strains, and determine a recovered load in the boom using the sensed strain and the curve fit parameters; and
a machine control system operatively associated with the loading system and the boom, the machine control system being configured to operate the shovel in accordance with the recovered load so the recovered load in the boom does not exceed a predetermined maximum permissible load for the boom.

18. The boom calibration system of claim 17, wherein said proximal end of the boom and said distal end of the boom are on opposite sides on a saddle block assembly.

19. The boom calibration system of claim 17, wherein said set of lower strain transducers mounted to the proximal end of the boom comprises at least one lower strain transducer mounted to a top plate of the boom and at least one lower strain transducer mounted to a bottom plate of the boom, and wherein said set of upper strain transducers mounted to the distal end of the boom comprises at least one upper strain transducer mounted to the top plate of the boom and at least one upper strain transducer mounted to the bottom plate of the boom.

20. The boom calibration system of claim 12, wherein said proximal end of the boom and said distal end of the boom are separated by a saddle block assembly.

\* \* \* \* \*